Nov. 24, 1959 W. C. HARMON 2,914,726
METHOD OF AND APPARATUS FOR INSPECTING WORK PIECES
Filed July 9, 1956 2 Sheets-Sheet 2

INVENTOR.
WILLIAM C. HARMON
BY D.D. Watts
RICHEY, WATTS, EDGERTON & McNENNY
ATTORNEYS United States Patent Office 2,914,726
Patented Nov. 24, 1959

2,914,726

METHOD OF AND APPARATUS FOR INSPECTING WORK PIECES

William C. Harmon, Chagrin Falls, Ohio, assignor to Republic Steel Corporation, Cleveland, Ohio, a corporation of New Jersey Application July 9, 1956, Serial No. 596,657

25 Claims. (Cl. 324—37)

This invention relates to a method of and means for determining certain electrical characteristics of metals and utilizing those characteristics particularly for separating pieces of ferrous materials of different grades or those having flaws or imperfections therein.

Still more particularly, the invention relates to improvements in flaw detectors of the type described in my U.S. Patent 2,660,704 issued November 24, 1953.

It is a principal object of the invention to determine the electrical characteristics of metallic objects by means of periodical varying electrical currents and to utilize the characteristics thus determined to separate the objects into desired and undesired classes.

Another object of the invention is to determine the presence of flaws or imperfections in ferrous objects, and particularly to ascertain the presence of breaks, slivers, seams, laps, and the like in steel billets.

Still another object of the invention is to provide a testing and sorting apparatus for metallic objects utilizing periodical varying electrical currents in which the operation of the apparatus is relatively independent of the distance from the test device to the object being tested.

Still another object of the invention is to provide a testing apparatus for metallic objects utilizing varying electrical currents of relatively high frequency which is stable in operation and unaffected by changes in the components thereof or in operating conditions.

In my U.S. Patent 2,660,704, above referred to, there is described a test device for locating flaws such as cracks, seams, breaks, slivers, laps, and the like in steel billets by measurements conducted at the surface of the billet. The apparatus therein described includes a search unit adapted to be positioned upon or adjacent to the billet and for subjecting the billet to a periodical varying electromagnetic field produced by a coil carried in the search unit. The search unit is energized by an oscillator which is located in an associated portable unit and is connected to the coil of the search unit by means of a cable which couples the coil of the search unit to the oscillator circuit in the portable unit. Suitable control and indication providing means serve to convert the signal variations produced by movement of the search unit about the billet into indications which inform the operator as to the relative characteristics of the various portions of the billet.

In practising the invention of the above referenced patent, I have discovered a further improvement wherein new results may be obtained and which, by certain modifications in the apparatus therein described, greatly extend the field of usefulness of that apparatus. In particular, I have discovered that by operating the test apparatus at certain frequencies, depending upon the character of the material being tested, rapid changes in the position of the search unit relative to the work piece do not produce false indications of flaws. Further, I have found that the particular frequency at which this effect occurs varies with the kind of material and with the treatment to which the material has been subjected prior to the time of the testing operation. In accordance with these discoveries, I have been able to separate objects of different kinds of material, or objects which have been differently treated, into classes of which the members are identical in composition or past treatment. I have discovered also, and describe herein, improvements in circuits of the apparatus of the prior patent which are particularly useful in accomplishing these results and for substantially improving the behavior and performance of the apparatus for any of its intended uses.

More specifically, there is disclosed and described herein, not only a simplified apparatus whereby the aforementioned new and novel results may be achieved by hand operation, but also an arrangement useful in connection with test apparatus described in the aforesaid patent in which the coil in the search unit is utilized as the primary frequency determining element for the oscillator of the apparatus. The improved circuit further incorporates a novel feedback arrangement for control of amplitude variations in the oscillator.

The invention, together with further objects, features and advantages thereof will be more clearly understood with reference to the following detailed specification and claims taken in accordance with the appended drawings, in which—

Figure 1:
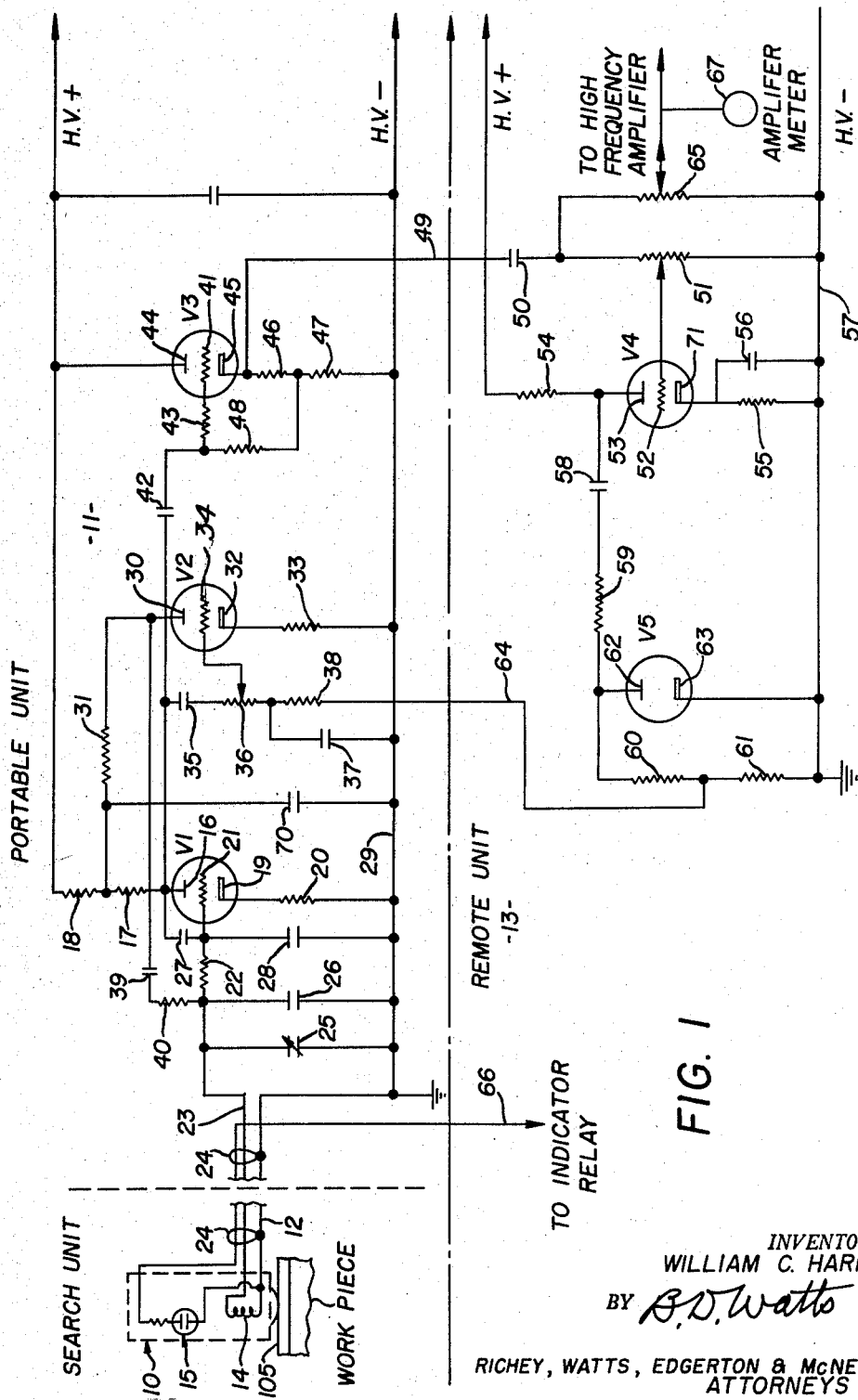
Fig. 1 is a schematic representation of the circuit arrangement of the improved flaw detector.

Referring now to Fig. 1, the apparatus therein shown is intended to be incorporated in an arrangement such as is described in my above referenced patent and includes a remote search unit 10 connected to a portable unit 11 by means of a cable 12. The portable unit 11 is connected to a remote unit 13 by suitable electrical connections (shown schematically). The portable unit 11 comprises an oscillator for generating variable electric currents of relatively high frequency in a coil 14 in the search unit. The search unit is moved about the vicinity of a test piece so that upon interception of flaws in the object, the reaction between the flawed material and the electrical field about the coil 14 causes a change in the amplitude of the signal voltages appearing at the output of the oscillator in the portable unit. This change in amplitude of output voltage is amplified by the circuits in the portable unit 11 and transmitted to the remote unit 13 where suitable apparatus is provided for actuating an indicator lamp 15.

In the arrangement of the present invention, tubes V1 and V2 in the portable unit 11 comprises an oscillator for generating periodically varying currents in the coil 14. Tube V1 functions as an amplifier stage while tube V2 functions as a feedback stage for control of the operation of the oscillator. Tube V1 includes an anode 16 which is connected to the positive pole of a suitable source of plate voltage through plate circuit resistors 17 and 18, while a cathode 19 is serially connected through a cathode dropping resistor 20 to the negative pole of the source of plate voltage. The plate resistor 18 and a plate by-pass capacitor 70 form a decoupling network for the plate circuit of tube V1. A control grid 21 is connected through a phase-shifting resistor 22 and conductor 23 of the cable 12 to the coil 14. The cable 12 has an outer conductor 24 thereof grounded and serves as a shielded return connection for the coil 14.

A variable capacitor 25 and a fixed capacitor 26 are connected across the coil 14 in the grid circuit of tube V1 and serve with that coil as the frequency-determining elements of the oscillator. A pair of capacitors 27 and 28 are serially connected between the anode 16 and the grid 21 and between the grid 21 and the ground return 29 to render the circuit relatively independent of the constants of the particular tube which is utilized as the tube V1.

The feedback stage of the oscillator comprising the tube V2 includes an anode 30 having an associated plate resistor 31 in the plate circuit thereof and connected to the junction of resistors 17 and 18. A cathode 32 of tube V2 is connected to the negative return conductor 29 through a cathode resistor 33. Tube V2 has a grid 34 connected in a grid circuit including a coupling capacitor 35 and a potentiometer 36, the latter comprising an amplitude level control for the apparatus. A capacitor 37 and a resistor 38 are connected to the grid circuit of tube V2 and serve as an integrating circuit to discriminate between bias voltage variations as described hereinafter. For the purposes of the present description, it may suffice to say that the grid bias for the tube V2 is developed between the potentiometer 36 and the return conductor 29. The anode 30 of tube V2 is coupled through a capacitor 39 and a resistor 40 to the grid circuit of tube V1. Changes in the plate circuit of tube V1 are, therefore, impressed through the grid circuit of tube V2 including the coupling capacitor 35 upon the grid 34 of tube V2. The subsequent changes produced in the plate circuit of tube V2 are then impressed upon the grid circuit of tube V1 so that the tubes V1 and V2 form an oscillating circuit having the search coil 14 as a primary frequency determining element.

Tube V3 functions as a cathode-follower amplifier and has the grid electrode 41 coupled to the anode 16 of tube V1 through a coupling capacitor 42 and a series grid resistor 43. The anode 44 of tube V3 is connected directly to the source of plate voltage while the cathode 45 is connected through cathode coupling resistors 46 and 47 to the negative return 29. A grid resistor 48 is connected between the grid circuit of tube V3 and the junction of the cathode resistors 46 and 47 to provide a bias voltage for the grid electrode 41.

A conductor 49 which extends between the portable unit 11 and the remote unit 13 is connected at the one end thereof to the cathode 45 of tube V3 and at the other end to a coupling capacitor 50. The capacitor 50 and a grid potentiometer 51 are connected to a grid 52 of a second amplifier tube V4 disposed in the remote unit 13. Tube V4 functions as an ordinary amplifier and has an anode 53 connected through a plate circuit resistor 54 to a source of plate voltage, while a cathode 71 is connected through a cathode resistor 55 and a cathode bias capacitor 56 to a return lead 57.

The signal variations in the anode circuit of the tube V4 are utilized to develop a bias voltage for the feedback stage of the oscillator, e.g. for tube V2. To this end, the anode 53 of tube V4 is connected through a coupling capacitor 58 and a series resistor 59 to a voltage dividing network including resistors 60 and 61. A tube V5 having an anode 62 connected to the junction of resistors 59 and 60 and a cathode 63 connected to the return conductor 57 serves to rectify the output of tube V4 so that the voltage across the voltage divider resistors 60 and 61 is uni-directional. A conductor 64 extending between the remote unit 13 and the portable unit 11 serves to connect the junction of resistors 60 and 61 to resistor 38 so that the uni-directional voltage developed across resistor 61 is applied to the grid 34 as a bias voltage.

The output of the cathode-follower amplifier V3 is utilized to control the operation of the remaining components in the remote unit 13. To this end, the potentiometer 65 is connected across the potentiometer 51 for control of the remaining apparatus. That apparatus, in turn, operates the indicator 15 through a conductor 66 which forms a part of the cable 12. For the purposes of description, the amplifier meter 67 is shown simply as connected to the potentiometer 65, although the meter and the circuits are described in detail in the application previously referred to.

In operation, the bias voltage for the grid 34 of the oscillator feedback tube V2 is provided by the signal voltages appearing at the anode 53 of tube V4. Tube V5 rectifies the signal voltages into uni-directional components, while the capacitor 37 and resistor 38 serve as a filter to produce a relatively constant voltage. The amplitude of the bias voltage is thus determined by the amplitude of the signal voltage variations at the anode of tube V4. Further, a finite time is required for changes in the amplitude of the signal voltage variations occurring at the anode 53 to be imparted to the grid 34 due to the delay action of capacitor 37 and resistor 38.

The magnitudes of the capacitor 37 and resistor 38 are such that any influences on the search coil which tend to cause relatively slow changes in the amplitude of the signal voltage generated by the oscillator are neutralized by the regulating or integrating action of those elements. They are, however, of such magnitude that changes of relatively short duration, e.g. of the order of time required for the search unit to pass over a flaw in the billet, are not cancelled out. These latter changes are, therefore, imparted to the high frequency amplifier through the potentiometer 65. In practice, the rapidity of the changes produced by the seams, cracks and similar defects and flaws in the billet is greater than that produced by other surface conditions so that the apparatus will provide a high order of discrimination between the effects produced thereby.

As thus described, the rapidity of the changes produced by seams, cracks, and similar defects and flaws in the billet or other work piece, is comparable to the rapidity of the changes produced by relative movement of the search unit toward and away from the work piece because of the abrupt nature of such discontinuities. Consequently, such movements result in indications by the apparatus of a flaw where, in fact, there is none. However, in accordance with my recent discoveries, I have found that with the apparatus disclosed in Fig. 1, certain adjustments are possible so that movement of the search unit toward and away from the work piece does not produce a change in the amplitude of the signal voltages produced by the oscillator and hence does not provide false indications of flaws.

In accordance with that discovery, the apparatus of Fig. 1 is adjusted to a critical frequency depending on the material of the work piece wherein variations of the distance of the coil from the work piece does not significantly effect the electrical characteristics of the coil 14 as the primary or principal frequency determining element of the oscillator, the capacitors 25 and 26 having been pre-set to fixed values.

In operation, the apparatus is initially adjusted by setting the potentiometer 36 so that the amplitude of the oscillations is great enough to prevent them from dying out completely for any position of the coil 14. On the other hand, the amplitude of the oscillations must be kept low enough so that the amplifying stages which follow the oscillator are never overloaded. The oscillator is then adjusted to some arbitrary frequency—say, for example, 10,000 cycles per second—and the search unit brought into the vicinity of a test piece or standard which has no flaws. As the search coil 10 approaches the test object, the amplitude meter of the remote unit 13 will be observed to increase or decrease slightly. If the meter reading increases as the search coil approaches the test object, the frequency of the osciliator should be increased. Inversely, a slight decrease in meter reading would necessitate a decrease in the oscillator frequency by increase in the capacitance of capacitor 25. After a series of such adjustments, a point will be reached wherein there is almost no change in the meter reading as the search coil is moved away from and toward the surface. The indicator light 15 will then no longer register a defect upon relative movement between the search coil and the test piece. The search coil may be moved about freely over the work piece without false indication of flaws and without impairment of normal responses and indications of flaws.

The reason for the aforementioned mode of operation is not entirely clear. However, it is believed that the phenomenon is explainable in terms of known physical principles. Thus, where the work piece is a ferrous material, the permeability effect of the iron in the material tends to increase the inductance and enhance the impedance of the coil by providing a field path of lower reluctance than that of open air. This permeability effect, resulting from the presence of the iron, is substantially constant over the range of frequency involved, e.g., frequencies in the order of 5,000 c.p.s. to 30,000 c.p.s. On the other hand, eddy currents are induced in the surface of the work piece by reason of the periodical varying currents generated by the coil of the search unit. The eddy current losses increase according to the square of the frequency and, whereas the permeability effect tends to increase the impedance of the detector coil and thereby reduce the loading on the oscillator and increase the amplitude of the oscillation generated, the production of eddy currents tends to reduce its inductance and impedance of the detector coil and reduce the amplitude of the oscillations. At the critical frequency, however, the permeability effect and the eddy current loss effects become equal and compensate each other so that the coil may be moved toward and away from the work piece without causing appreciable change in the impedance of the coil and without appreciably changing the oscillation amplitude of the oscillator.

In the circuit arrangement of Fig. 1, when operated at an arbitrary frequency without an attempt to reach a critical or balance frequency as described above, the feedback system will, under certain circumstances, cancel out the effect of the distance between the coil and the object under inspection. This will occur when the change of distance between the coil and work piece takes place relatively slowly. There are many circumstances, however, when the relative motion between the coil and the surface of inspection is so rapid that the time constant of the elements in the feedback system is such that the elements cannot function to cancel out the changes. This occurs particularly when the search coil is manipulated over small bumps or ridges on the surface of the work piece. Under such circumstances, if the time constant of the feedback network is adjusted to cancel the changes which result in false indications, the feedback network will also cancel the changes produced by the various defects which are sought to be located. Consequently, the use of the apparatus, other than at the critical frequencies, is substantially limited to manual operation inasmuch as the effects of the variation and distance from the coil to the work piece produced by ridges and the like must be recognized by an operator.

Figure 2:
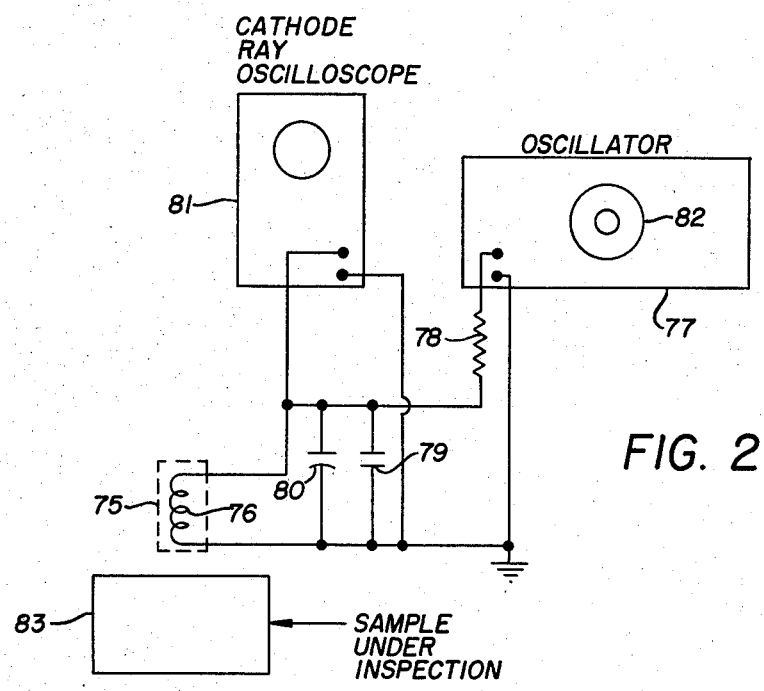
Fig. 2 is a schematic representation of an embodiment of the invention useful in practising the method or methods thereof.

I have devised and illustrate herewith in Fig. 2, an apparatus for utilizing my discovery in the determination of the characteristics of work pieces—that is, to determine the character of a work piece by determining the critical or balance frequency. As shown in Fig. 2, there is provided a search unit 75 having a search coil 76 which is connected to and energized by an oscillator 77 through a resistor 78. Capacitors 79 and 80 are connected across the search coil 76 together with the input terminals of a cathode oscilloscope 81. The oscillator serves as an independent generator of periodically varying currents whose frequency may be adjusted by the control 82 and the cathode oscilloscope provides an indication of the amplitude of the voltages across the search coil 76. The arrangement has no feedback system such as is utilized in the circuit arrangement of Fig. 1.

In operation, the search unit 75 is positioned adjacent a work piece 83 and moved toward and away from the work piece while adjusting the control 82 until the movement of the search unit 75 toward and away from the work piece produces no change in the amplitude of the voltage across the search coil 76 as indicated by the oscilloscope 81. The frequency may then be read on the control 82 and that frequency is the critical frequency for the sample or the particular area of the sample.

The critical frequency at which the above described operation takes place, is a function not only of the work piece, but of the coil 76 and the capacitor 79. However, for a given coil 76 and a given capacitor 79, the critical frequency reached characterizes the condition or the nature of the work piece.

With the arrangement set forth in Fig. 2, I have found that a critical or balance frequency could be determined for copper or polyiron. This is contrary to the experience with the arrangement of Fig. 1 wherein the critical frequency for these materials could not be obtained.

As an example of the practice of the invention, the critical or balance frequencies for several materials follows herewith:

| Sample | Resonant Frequency 76, 79, 80 in Air | Resonant Frequency 76, 79, 80 on Sample | Critical Frequency |
|---|---|---|---|
| 8740 Steel, Light Scale On Surface | 9,600 | 9,200 | 9,400 |
| 4340 Steel, Light Scale On Surface | 9,600 | 9,210 | 9,400 |
| 6150 Steel, Light Scale On Surface | 9,600 | 9,210 | 9,360 |
| 1018 Steel, Cold Drawn | 9,600 | 9,200 | 9,275 |
| 1018 Steel, Cold Drawn, Cold Worked | 9,600 | 9,200 | 9,220 |
| 1018 Steel, Cold Rolled | 9,600 | 9,200 | 9,275 |
| 1018 Steel, Annealed Light Scale on Surface | 9,600 | 9,200 | 9,370 |
| 1018 Steel, Annealed Cold Worked, Light Scale on Surface | 9,600 | 9,230 | 9,260 |
| Samples of Special Materials: | | | |
| Polyiron (Compressed Iron Powder) | 9,600 | 9,100 | 9,550 |
| Brass, No Scale | 9,600 | 9,900 | 10,700 |
| Copper, No Scale | 9,600 | 10,050 | 10,450 |

I have discovered also that the critical or balance frequency is effected by the condition of the work piece at the time of inspection. Particularly, I have found that surface cold work modifies the critical or balance frequency for the given material or work piece and there follows herewith a tabulation of the effect upon the critical or balance frequency for several materials produced by cold working:

| Material | Condition | Critical Frequency, c.p.s. |
|---|---|---|
| 1018 Steel | Annealed | 9,500 |
| | Surface—maximum, Cold work by hammering | 9,300 |
| 4340 Steel | Annealed | 9,550 |
| | Surface—maximum, Cold work by hammering | 9,350 |
| 8630 Steel | Annealed | 9,650 |
| | Surface—maximum, Cold work by hammering | 9,400 |

Cold work conditions intermediate between the annealed condition and the maximum cold worked surface conditions produce corresponding critical frequencies intermediate to those given in the table.

Figure 3:
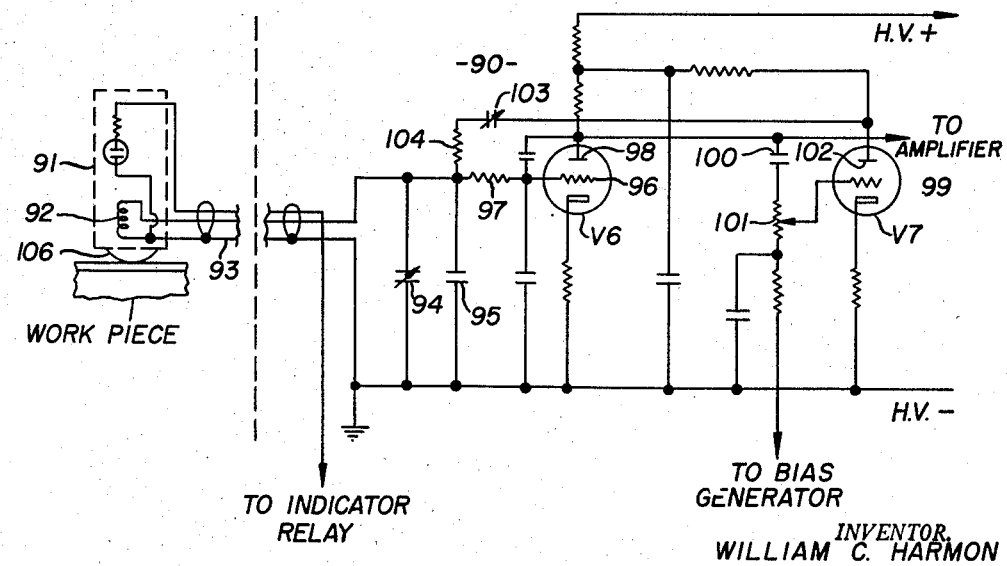
Fig. 3 is a schematic representation showing a modified part of the circuit of Fig. 1.

Referring now to Fig. 3, there is shown a modification of the apparatus of Fig. 1 useful in practicing the invention under certain circumstances. As shown in Fig. 3, the oscillator 90 comprises two vacuum tubes V6 and V7 constituting amplifier and feedback stages for the oscillator respectively. A search unit 91 includes a coil 92 which is connected through a cable 93 in the grid circuit of the tube V6. Two capacitors 94 and 95 are connected in parallel with the coil 92 to constitute a frequency determining means for the oscillator, the coil 92 and the capacitors 94 and 95 being connected to the grid electrode 96 of the tube V6 through a phase shifting resistor 97 in the same fashion as the circuit of Fig. 1. The anode 98 of the tube V6 is connected to the grid electrode 99 at tube V7 by means of a circuit including a coupling capacitor 100 and the potentiometer 101. The circuit connecting the anode 102 of the tube V7 with the junction of the coil 92, capacitors 94 and 95 and resistor 97 and hence the grid electrode 96, however, includes a variable capacitor 103 as well as the series resistor 104. The capacitor 103 is made adjustable in order to vary the phase relationship between the voltages across the coil 92, the voltage of the grid electrode 96, and the anode 102.

The operation of the circuit of Fig. 3 is similar to that of the circuit of Fig. 1 except that the capacitor 103 is adjusted until a frequency may be obtained by adjustment of capacitor 94 in which the output indication is independent of the movement of the search unit toward and away from the work piece. The provision of an adjustable feedback capacitor, e.g. the capacitor 103, is a necessity, particularly for testing certain steel alloys, although certain surface or cold work conditions may also improve the operation in connection with ordinary steels. Examples of materials and conditions in which the adjustment of the capacitor 103 is necessary or advantageous follows:

| Material | Surface | Freq., c.p.s. | Search Coil Total Shunt Capacitance, 94 and 95 mfd. | Phase Shunt Capac., 103 mmfd. | Approx. Phase Shift, degrees |
|---|---|---|---|---|---|
| 8620 | Normal Hot Rolled Scale | 10,500 | .00215 | 50 | 54 |
| | Sanded Bare | 10,500 | .00215 | 50 | 54 |
| | End-Saw Cut | 9,000 | .00215 | 500 | 41 |
| 80B50 | Normal Hot Rolled Scale | 10,500 | .00215 | 50 | 54 |
| | Sanded Bare | 9,000 | .00215 | 500 | 41 |
| | End-Saw Cut | 9,000 | .00215 | 500 | 41 |
| 14B50 | Normal Hot Rolled Scale | 10,500 | .00215 | 50 | 54 |
| | Sanded Bare | 10,000 | .00215 | 150 | 48 |
| | End-Saw Cut | 9,000 | .00215 | 500 | 41 |
| J-55 | Normal Light Scale | 9,000 | .00215 | 500 | 41 |
| | Pipe Finish | 10,000 | .00215 | 150 | 48 |

8620—Chrome, nickel, molybdenum alloy.
80B50—Boron treated, chrome, nickel, molybdenum alloy.
14B50—Boron treated, medium carbon steel.
J-55—Medium carbon high manganese steel.

It will be apparent that by determining the critical or balance frequency of a work piece having a known characteristic or quality as set forth above, that certain desirable consequences or results may be achieved. First, in the operation of a flaw detector, as herein before set forth, the separation of the flawed pieces from acceptable pieces, or portions of flawed pieces may be located for separation from the acceptable portions of those pieces. This may be accomplished without the possibility of erroneous separations being made either because of surface conditions of the work piece where the search unit is in contact with the work piece, or because of relative movement between the work piece and the search unit generally when the search unit is out of contact with the work piece. Secondly, a method is had for separating work pieces, particularly of ferrous materials, by ascertaining the critical frequencies of a piece whose constitution is unknown and comparing that critical frequency with the critical frequencies of test pieces whose constitution or condition is known. Thus, in the latter instance, where, in a production process a plurality of pieces appear upon a production line, it is necessary to accept or reject the pieces according to whether a certain degree of cold work has been achieved at the surface. A determination of the critical frequency of each of the pieces will enable the separation of those pieces having a desired degree of cold work from those having an insufficient degree of cold work.

In the arrangements of Figs. 1 and 3, the search units contact the work pieces by means of contact shoes 105 and 106, respectively, so that surface irregularities, such as the ridges previously referred to, cause the movement of the search coil toward and away from the work piece. Such a contact shoe may be utilized with the arrangement of Fig. 2, although when the critical frequency technique is employed for separating the pieces according to their characteristics thus determined, the search unit may be spaced from the work piece and moved toward and away from the piece. The distances traversed by the search coil are, in any event, small compared to the size of the object or the extent of the surface and the movements are not of a magnitude such that the gross effect of the work piece upon the electrical characteristics of the coil would be involved. Further, the specific orientation of the coil or search unit, with respect to the work piece, is maintained throughout the testing procedure.

It is to be understood that the foregoing description is not intended to restrict the scope of the invention and that various rearrangements of the parts and modifications of the design may be resorted to, giving effect to a liberal interpretation to the claims as herein set forth.

This application is a continuation-in-part of my copending application Serial No. 306,445 filed August 26, 1952, now abandoned.

Having thus described this invention in such full, clear, concise and exact terms as to enable any persons skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. In combination, an oscillator comprising an amplifier stage and a feedback stage, each including an electron means having a grid circuit and a plate circuit, the grid circuit of each stage being coupled to the plate circuit of the other stage, a coil in the grid circuit of said amplifier stage adapted to be placed in proximity to an object to be tested, amplifying means coupled to the plate circuit of said amplifier stage, and rectifying means connected between the output of said amplifying means and the grid circuit of said feedback stage for applying a bias to the grid circuit of the feedback stage, said grid circuit including means for integrating changes in bias potential produced by the rectified signals from the amplifying stage.

2. In a flaw detector, in combination, an oscillator comprising an amplifier stage and a feedback stage, each stage including electron means having a grid circuit and a plate circuit, the grid circuit of each stage being coupled to the plate circuit of the other stage, a coil in the grid circuit of said amplifier stage adapted to be placed in proximity to a work piece to be tested, amplifying means having the input thereof coupled to the plate circuit of said amplifier stage, said amplifying means having an output plate circuit and a circuit connected between the plate circuit of said amplifying means and the grid circuit of said feedback stage, said circuit including reactance elements for integrating signals impressed upon the grid circuit, and rectifying means connected to said circuit for applying only unidirectional bias voltages to said grid circuit.

3. In a flaw detector, in combination, an oscillator comprising an amplifier stage and a feedback stage, each including an electron device having a grid circuit and a plate circuit, the grid circuit of each stage being coupled to the plate circuit of the other stage, a coil adapted to be placed in proximity to a work piece to be tested, a cable connected between the coil and the grid circuit of the amplifier stage, amplifying means having the input thereof connected to the plate circuit of said amplifier stage, said amplifying means having an output plate circuit and a circuit connected between the plate circuit of said amplifying means and the grid circuit of said feedback stage, said circuit including reactance elements for integrating signals impressed upon the grid circuit, and rectifying means connected to said circuit for applying only unidirectional bias voltages to said grid circuit.

4. In a detecting device, the combination of an oscillator comprising two vacuum tubes, each having a cathode, an anode and a grid electrode, means coupling the grid of each tube with the plate of the remaining tube, a coil connected to the grid and the cathode of a first tube, the coil being adapted to be brought into the vicinity of the work piece, amplifying means coupled to the anode of the first tube, rectifying means connected to the output of said amplifying means, and an integrating circuit connected between the said rectifying means and the grid electrode of the said second tube, said integrating circuit having a time constant of greater than a predetermined magnitude for permitting the bias of the said grid electrode to vary relatively slowly.

5. The invention in accordance with claim 4, said integrating circuit comprising a resistor connected in series between the said rectifying means and the grid electrode of the second tube, and a capacitor connected between the grid electrode and the cathode of said second tube.

6. In a flaw detector, in combination, an oscillator comprising an amplifier stage and a feedback stage, each including a vacuum tube having a plate circuit and a grid circuit, the grid circuit of each stage being coupled to the plate circuit of the other stage, one and only one coil in the grid circuit of said amplifier stage comprising a frequency determining element for the oscillator adapted to be placed in proximity to a metallic object to be tested, an amplifier stage comprising a cathode follower having the input thereof coupled to the plate circuit of said amplifier stage, amplifying means having the input thereof coupled to the cathode of said cathode follower, said last-named amplifying means including a vacuum tube having an anode and a cathode, a circuit connected between the last-named anode and the grid circuit of said feedback stage including a rectifier for applying unidirectional bias voltages to the grid circuit of the feedback stage, and means including time delay elements connected to the said rectifying means and the said grid circuit for delaying changes in the bias voltage for a predetermined interval of time.

7. The invention in accordance with claim 6, the said time delay elements comprising a resistor in series connection between the feedback stage and the rectifier, and a capacitor connected to the resistor at the feedback stage end thereof and to the cathode circuit of the last-named amplifying means.

8. In a flaw detector, in combination, an oscillator comprising an amplifier stage and a feedback stage, each stage including an vacuum device having a grid circuit and a plate circuit, the grid circuit of each stage being coupled to the plate circuit of the other stage, a coil adapted to control the frequency of said oscillator in conjunction with suitable capacitors, a cable connected between said coil and the grid circuit of the said amplifier stage for permitting the coil to be moved in the vicinity of an object to be tested, amplifying circuit having its input coupled to the output of said oscillator, rectifying means connected between the output of said amplifying means and the grid circuit of said feedback stage for applying a bias potential to the vacuum device of that stage, and means connected between said rectifying means and the said grid circuit for delaying changes in the bias potential for a predetermined interval of time.

9. In a flaw detector, in combination, an oscillator comprising an amplifier tube having a cathode, an anode, and a control electrode, a pick-up coil and a capacitor in shunt therewith connected from the control electrode to the cathode to form an oscillation circuit, a feedback tube having a cathode, an anode and a control electrode, means coupling oscillation frequency changes at the anode of the amplifier tube to the control electrode of the feedback tube, means for coupling oscillation frequency changes at the anode of the feedback tube to the control electrode of the amplifier tube including a series capacitor, and means for biasing the grid of the feedback tube in accordance with the amplitude of the oscillations of the oscillator including a circuit connected to the anode of the amplifier tube, a rectifier for impressing unidirectional bias voltages upon the control electrode of the feedback stage, and delay elements for delaying changes in the bias voltages for a predetermined interval of time greater than the changes produced by movement of the pick-up coil over the flaws in the work piece.

10. The invention in accordance with claim 9, including a circuit interposed between the oscillation circuit and the coupling means for coupling oscillation frequency changes at the anode of the feedback tube to the control electrode of the amplifier tube and the control electrode of the amplifying tube including a series resistor connected to the control electrode, a capacitor connected from the cathode to the control electrode and a capacitor connected from the control electrode to the anode of the amplifier tube.

11. In a detector device, in combination, an oscillator for generating oscillation frequency currents in a pick-up coil comprising an amplifier stage and a feedback stage, each including an electron device having a cathode and anode and control electrode, a pick-up coil and a shunt capacitor having respective ends connected to the control electrode and to the cathode of the amplifier stage device, the coil constituting with the capacitor, the frequency determining means for the oscillator, and being adapted to be placed at proximity to a work piece, means for coupling oscillation frequency changes at the anode of the amplifier stage device to the control electrode of the feedback stage device, means for coupling oscillation frequency changes at the anode of the feedback stage device to the control electrode of the amplifier stage device, and means connected to the amplifier stage for indicating the amplitude of oscillation frequency currents therein, and adjustable means for varying the impedance of the last-named coupling means.

12. The invention in accordance with claim 11, the said adjustable means comprising a variable capacitor connected in series between the named anode and control electrode respectively.

13. The invention in accordance with claim 11, in which the adjustable means last named comprises a variable capacitor connected in series between the main anode and control electrode and in which a resistor is interposed between the control electrode of the amplifier stage device and the coil and two capacitors.

14. In combination, a work piece, a search unit incorporating a search coil, said work piece and search unit being on opposite sides of a plane the search unit being in contact with the surface of the piece and being adapted to move toward and away from the work piece, and means for energizing the search coil with periodically varying currents at the critical frequency of the work piece whereby the effect of the work piece upon the search coil is rendered substantially independent of variations in the surface of the work piece as the search unit is moved over the piece.

15. The invention in accordance with claim 14, in which the work piece is a piece of ferrous material and a frequency is in the range from 9,000 to 11,000 cycles per second.

16. The invention in accordance with claim 14, with a shunt capacitance connected across the search coil.

17. The method of detecting flaws in work pieces by means of a flaw detector of the type in which a search coil is positioned relative to a work piece which comprises energizing the coil by means of periodically varying current, altering the frequency of such current variations for ascertaining a frequency such that the amplitudes of the currents in the search coil are not affected by movements of the coil toward and away from the work piece while energizing said coil at said frequency, and moving the coil about the work piece while sensing amplitude changes in the search coil to detect flaws in the piece.

18. The method of detecting flaws in work pieces by means of a flaw detector of the type in which a search unit having a pick-up coil is moved over the surface of the work piece in contact therewith which comprises energizing the coil by means of a periodically varying electrical current, altering the frequency of such variations for ascertaining a frequency such that the amplitudes of the currents in the search coil are not effected by movements of the coil toward and away from the work piece, and then moving the search unit over the surface of the work piece and in contact therewith to locate flaws adjacent the surface of the piece while energizing said coil at said frequency.

19. The method of locating flaws in workpieces by means of a flaw detector of the type in which a search unit carrying a search coil contacts the surface of the piece which comprises energizing the search coil with a periodically varying current of a given frequency, moving the coil toward and away from the work piece while energizing the coil with the currents of a frequency such that said movement produces an increase and decrease of the voltage across the coil respectively, energizing the coil with a current at a second frequency such that moving the coil toward and away from the work piece produces an increase and decrease of the voltage across the search coil respectively, and then energizing the coil with the current of an intermediate frequency such that the movement of the coil toward and away from the work piece produces no change in the amplitude of the voltage across the coil, and then relatively moving the search coil and the work piece to ascertain the presence of flaws in the work piece independently of the physical condition of the surface of the work piece.

20. The method of adjusting a flaw detector of the type in which a search coil carrying a periodically varying current is positioned relative to a work piece to render the flaw detector independent of relative movement of the search coil toward and away from the work piece which comprises energizing the coil with periodically varying currents of a first frequency, moving the coil toward and away from the work piece while measuring the accompanying voltage changes across the coil and adjusting the frequency of the periodically varying currents until movement of the coil toward and away from the work piece produces no change in the voltage across the coil.

21. The method of separating ferrous work pieces according to predetermined characteristics thereof by means of a flaw detector of the type in which a search coil carrying a periodically varying current is positioned relative to the work piece which comprises altering the frequency of such variations for ascertaining an operating frequency for the flaw detector such that the operation thereof is independent of movement of the search coil toward and away from a test piece having the desired characteristic energizing said coil at said frequency, inspecting work pieces by similarly obtaining the critical frequencies therefor, and separating the pieces according to the critical frequencies thus determined.

22. The method of separating work pieces according to predetermined characteristics by subjecting the pieces to a field generated by a coil carrying periodically varying currents which comprises altering the frequency of such variations for determining the critical frequency of a piece having the desired characteristics energizing said coil at said frequency, similarly determining the critical frequencies of the work pieces, and then separating the work pieces according to the critical frequencies thus determined.

23. In combination, a work piece of predetermined characteristics, and means to detect a defect in said work piece, said means comprising a test coil adapted to be moved toward and away from said work piece, and circuit means for energizing the test coil, said circuit means including an oscillator having an amplifier stage and a feed back stage, each including an electron device having a grid circuit and a plate circuit, a cable connected between the coil and the grid circuit of the amplifier stage, amplifying means having the input thereof coupled to the plate circuit of said amplifier stage and an output plate circuit, and a circuit connected between the plate circuit of said amplifying means and the grid circuit of said feed back stage, said circuit means and search coil having parameters so proportioned with respect to the characteristics of said work piece and with respect to each other as to provide oscillations in said search coil of a frequency such that the amplitude of the current in the coil is unaffected by movement of the coil toward or away from the work piece.

24. The invention in accordance with claim 23, in which the work piece is a piece of ferrous material and a frequency is in the range from 5,000 to 30,000 cycles per second.

25. The invention in accordance with claim 23, with a shunt capacitance connected across the search coil.

References Cited in the file of this patent

UNITED STATES PATENTS

| | | |
|---|---|---|
| 2,267,884 | Zuschlag | Dec. 30, 1941 |
| 2,393,717 | Speaker | Jan. 29, 1946 |
| 2,489,920 | Michel | Nov. 29, 1949 |
| 2,576,173 | Cornelius | Nov. 27, 1951 |
| 2,581,394 | Dinger | Jan. 8, 1952 |
| 2,660,704 | Harmon et al. | Nov. 24, 1953 |
| 2,819,447 | Harmon | Jan. 7, 1958 |